Patented Mar. 6, 1951

2,544,079

UNITED STATES PATENT OFFICE 2,544,079

SILAHYDROCARBONS

John T. Goodwin, Jr., Midland, Mich., assignor to Dow Corning Corporation, Midland, Mich., a corporation of Michigan No Drawing. Application March 19, 1949, Serial No. 82,473

5 Claims. (Cl. 260—448.2)

The present invention relates to new organosilicon materials.

The present organosilicon industry is based upon siloxanes which are materials in which the silicon atoms are linked through oxygen atoms. Another type of silicon compound is one in which the silicon atoms are linked directly to each other. Still a third type is one in which the silicon atoms are linked by organic radicals. The literature presents very little information on this last type of compound, and it is one with which the present application is concerned.

Objects of the present invention are the provisions of new compounds which are of general utility industrially. Other objects and advantages of the present invention will be apparent from the following description and the subjoined claims.

Compounds in accordance herewith are of the formula $R[SiR_2CH_2]_nSiR_3$ in which each R represents a radical of the group consisting of methyl and phenyl and which compound contains both methyl and phenyl, and $n$ has a positive value of at least one. Thus, when $n$ has a value of 1, hexaorganodisilmethylene compounds are produced.

The thermal stability of the present compounds is somewhat better than that of siloxanes. The stability of these compounds at high temperature in the presence of steam is substantially better than the stability of siloxanes under equivalent conditions.

The present compounds may be prepared by various methods. Thus, compounds of the type $Cl(SiCl_2CH_2)_nSiCl_3$ may be reacted with Grignard reagents prepared from a methyl halide and from a phenyl halide whereby to substitute both methyl and phenyl for the chlorine atoms.

Likewise these compounds have been prepared by contacting a compound of the type $R_3SiCH_2Cl$ with an alkali metal in the presence of a compound of the type $R_3SiCl$. This method produces a compound of the type $R_3SiCH_2SiR_3$ in which R represents both methyl and phenyl radicals. In order to produce compounds of this type by this general method but in which compounds $n$ is greater than one, a compound of the type $R(SiR_2CH_2)_nCl$ may be substituted for the compound $R_3SiCH_2Cl$. By this method the larger linear compounds have been produced. These general methods are disclosed in my copending applications Serial Nos 22,254 and 22,255 filed April 20, 1948, now U. S. Patents 2,507,513 and 2,483,972 respectively.

The production of the present compounds may be by interacting a compound of the type $Cl(SiR_2CH_2)_nSiR_2Cl$ with a Grignard reagent of the type RMgX where R represents methyl and phenyl radicals and X represents a halogen atom. The production of this organosilicon chloride is disclosed in my copending application Serial No. 22,252 filed April 20, 1948.

The compounds hereof are of utility for such purposes as hydrophobing agents, lubricants, and hydraulic fluids.

The following examples illustrate the method of the present invention.

Example 1

A mixture of 164 parts by weight of

$ClCH_2Si(CH_3)_2C_6H_5$ and 265 parts of $(C_6H_5)_3SiCl$ in 173.2 parts of dry toluene was prepared. This mixture was kept sufficiently warm to keep the triphenylchlorosilane in solution. Next 46 parts of sodium were melted by refluxing in 216.5 parts of toluene. The silane mixture was then gradually added to the sodium. The mixture was refluxed for 35 minutes and filtered to remove sodium chloride. The product was stripped free of toluene and distilled. There were obtained 200 parts of a dimethyltetraphenyldisilmethylene of the formula $C_6H_5(CH_3)_2SiCH_2Si(C_6H_5)_3$. The compound was found to have a boiling point of 195° C. at .5 mm., a melting point of —26° C., a refractive index at 25° C. of 1.5917, a density at 25° of 1.0505, and a viscosity of 194 cs. at 25° C.

Example 2

Phenyl Grignard was added to a solution of $CH_3Cl_2SiCH_2SiCl_3$ in amount sufficient to replace all chlorine atoms with phenyl radicals. The reaction product was then poured onto cracked ice. The phenylated material was separated by decantation from the aqueous salt solution and the products stripped of solvent. The principal product was $CH_3(C_6H_5)_2SiCH_2Si(C_6H_5)_3$. This compound was found to have a boiling point of 245° C. at .4 mm., a refractive index of 1.6148 at 25° C., and a density of 1.091 at 25° C.

Example 3

250 parts by weight of $(CH_3)_2ClSiCH_2SiCl_2CH_3$ were reacted with 728 parts of phenyl magnesium bromide in 140 parts of absolute ether. The preparation was conducted as in Example 2. A 31 percent yield of a trimethyltriphenyldisilmethylene of the formula $(CH_3)_2C_6H_5SiCH_2Si(C_6H_5)_2CH_3$ was obtained. This compound was found to have a boiling point of 165° C. at .2 mm., a melting point of —50° C., a refractive index of 1.5800 at 25° C., a density of 1.0214 at 25° C., and a viscosity of 35.6 cs. at 25° C.

Example 4

A mixture of 73.8 parts of $(CH_3)_3SiCH_2SiCl_3$ and 112.6 parts of $C_6H_5Cl$ in 346.4 parts of dry toluene was prepared. This mixture was re-

acted with 50.5 parts of metallic sodium. The preparation was conducted as in Example 1.

A 61 percent yield of a trimethyltriphenyldisilmethylene of the formula $$(CH_3)_3SiCH_2Si(C_6H_5)_3$$

was obtained. This compound was found to have a boiling point of 151° C. at .05 mm. and a melting point of 63° C.

Example 5

Phenyl Grignard was added to an ether solution of $Cl_2CH_3SiCH_2SiCH_3Cl_2$ in amount sufficient to replace all chlorine atoms with phenyl radicals. The reaction product was then poured onto ice. The phenylated material was separated by decantation from the aqueous salt solution and the products stripped of solvent. The principal product was a dimethyltetraphenyldisilmethylene of the formula $(C_6H_5)_2CH_3SiCH_2SiCH_3(C_6H_5)_2$. This compound was found to have a boiling point of 199° C. at .2 mm. and a melting point of 78° C.

Example 6

Phenyl Grignard was added to an ether solution of $Cl(CH_3)_2SiCH_2Si(CH_3)_2Cl$ in amount sufficient to replace all chlorine atoms with phenyl radicals. The reaction product was then poured onto ice. The phenylated material was separated by decantation from the aqueous salt solution and the products stripped of solvent. The principal product was a tetramethyldiphenyldisilmethylene of the formula $C_6H_5(CH_3)_2SiCH_2Si(CH_3)_2C_6H_5$. This compound was found to have a boiling point of 143° C. at .3 mm., a melting point of less than −73° C., a refractive index of 1.5426 at 25° C., a density of .9615 at 25° C., and a viscosity of 6.06 cs. at 25° C.

Example 7

Phenyl Grignard was added to an ether solution of $(CH_3)_3SiCH_2Si(CH_3)_2OC_2H_5$ in amount to replace all of the ethoxy radicals. The ether was distilled off and the residue heated at 150° C. overnight. The reaction product was then poured onto cracked ice. The phenylated material was separated by decantation from the aqueous salt solution and the product stripped of solvent. The principal product was $$(CH_3)_3SiCH_2Si(CH_3)_2C_6H_5$$

This compound was found to have a boiling point of 125° C. at 25.5 mm., a refractive index of 1.4940 at 25° C., a density of .8763 at 25° C., and a specific refraction of .3320.

Example 8

89.7 parts by weight of $$(CH_3)_3SiCH_2SiCH_3(OC_2H_5)_2$$

were mixed with 173.2 parts of toluene and this mixture added to 208.7 parts of the Grignard reagent, $C_6H_5MgBr$, in ether solution. After standing overnight, the ether was taken off. The mixture was then refluxed at 105° C. for 5 hours. The principal product was $$(CH_3)_3SiCH_2SiCH_3(C_6H_5)_2$$

This compound had a boiling point of 145° to 153° C. at 3 mm., a freezing point of −63° C., a refractive index of 1.5391 at 25° C., a density of 0.9643 at 25° C., a specific refraction of 0.3133, and a viscosity of 8.22 cs.

Example 9

305 parts by weight of $C_6H_5(CH_3)_2SiCH_2Cl$ and 157.8 parts of $C_6H_5CH_3SiCl_2$ were mixed and this mixture added to 83.5 parts of sodium in 1039.2 parts of refluxing toluene. The mixture was stirred vigorously, refluxed for 1 hour and filtered to remove sodium chloride. The product was stripped free of toluene and distilled. The principal product was $$C_6H_5(CH_3)_2SiCH_2SiC_6H_5CH_3CH_2Si(CH_3)_2C_6H_5$$

This compound had a boiling point of 180° C. at 0.2 mm., a freezing point of −44° C., a refractive index of 1.5632 at 25° C., a density of 0.9985 at 25° C., a specific refraction of 0.3248 and a viscosity of 37.82 cs.

Example 10

276 parts by weight of $ClCH_2(CH_3)_2SiC_6H_5$ were mixed with 190 parts of $(C_6H_5)_2SiCl_2$ and 175.6 parts of benzene. 67.5 parts of sodium emulsified in toluene and xylene were gradually added to the above mixture over a period of several hours, at a rate sufficient to maintain the temperature at 50° to 60° C. The mixture was then refluxed for several hours. The excess sodium was neutralized by adding isopropanol. The product was washed with dilute HCl and stripped solvent free. 220 parts of $$C_6H_5(CH_3)_2SiCH_2Si(C_6H_5)_2CH_2Si(CH_3)_2C_6H_5$$

were obtained. This compound had a boiling point of 182–203° C. at 0.3 mm., a freezing point of 18 to 21° C., a refractive index of 1.5724 at 25° C., a specific refraction of 0.3292, and a viscosity of 604 cs.

Example 11

101.3 parts by weight of $(C_6H_5)_2SiCl_2$, 57.2 parts of $ClCH_2Si(CH_3)_2Cl$, and 147.6 parts of $$ClCH_2Si(CH_3)_2C_6H_5$$

were mixed. This mixture was added to 60 parts of molten sodium in 433 parts of toluene. The reaction mixture was refluxed for 1 hour. The excess sodium was neutralized with isopropanol. The product was washed with dilute HCl and stripped solvent free. There was a yield of 174.8 parts of residue containing $$C_6H_5(CH_3)_2SiCH_2Si(C_6H_5)_2CH_2Si(CH_3)_2$$
$$CH_2Si(CH_3)_2C_6H_5$$

This residue had a viscosity of 381 cs., a carbon content of 69.90%, a silicon content of 19.75%, and a carbon to silicon ratio atomic of 8.26.

That which is claimed is:

1. Compounds of the general formula $$R(SiR_2CH_2)_nSiR_3$$

in which each R represents a radical of the group consisting of methyl and phenyl and which compound contains both methyl and phenyl radicals and $n$ is a positive integer of at least one.

2. Trimethyltriphenyldisilmethylene.
3. Dimethyltetraphenyldisilmethylene.
4. 1,1,3 trimethyl-1,3,3 triphenyldisilmethylene.
5. 1,1 dimethyl-1,3,3,3 tetraphenyldisilmethylene.

JOHN T. GOODWIN, JR.

REFERENCES CITED

The following references are of record in the file of this patent:

Sommer: "Jour. Am. Chem. Soc.," vol. 69 (1947), page 980.

Goodwin: "Jour. Am. Chem. Soc.," vol. 69 (1947), page 2247.

Bluestein: "Jour. Am. Chem. Soc.," vol. 70 (1948), page 3068.